United States Patent
D'Amico et al.

(10) Patent No.: US 10,043,430 B1
(45) Date of Patent: Aug. 7, 2018

(54) EYECUP-DISPLAY ALIGNMENT TESTING APPARATUS

(71) Applicant: Oculus VR, LLC, Menlo Park, CA (US)

(72) Inventors: Samuel Redmond D'Amico, Irvine, CA (US); Simon Hallam, San Jose, CA (US); Kieran Tobias Levin, Redwood City, CA (US)

(73) Assignee: Oculus VR, LLC, Menlo Park, CA (US)

( * ) Notice: Subject to any disclaimer, the term of this patent is extended or adjusted under 35 U.S.C. 154(b) by 93 days.

(21) Appl. No.: 15/218,745

(22) Filed: Jul. 25, 2016

(51) Int. Cl.
*G09G 3/00* (2006.01)
*G02B 27/01* (2006.01)
*G02B 27/00* (2006.01)

(52) U.S. Cl.
CPC .......... *G09G 3/006* (2013.01); *G02B 27/0025* (2013.01); *G02B 27/0176* (2013.01); *G02B 2027/0163* (2013.01); *G09G 2330/12* (2013.01)

(58) Field of Classification Search
CPC ....................................................... G09G 3/006
USPC ....................................................... 345/618
See application file for complete search history.

(56) References Cited

U.S. PATENT DOCUMENTS

2012/0120103 A1* 5/2012 Border ................. G02B 27/017
345/633

OTHER PUBLICATIONS

Rensing, Noa. "Registration of an On-Axis See-Through Head-Mounted Display and Camera System." Optical Engineering 44.2 (2005).*

* cited by examiner

*Primary Examiner* — Shivang Patel
(74) *Attorney, Agent, or Firm* — Fenwick & West LLP

(57) ABSTRACT

An apparatus for aligning an eyecup to an electronic display panel of a head-mounted display is presented in this disclosure. The eyecup is coupled to the electronic display panel forming an eyecup assembly. An imaging device captures one or more images of image light projected by the electronic display panel through the eyecup. A calibration controller, interfaced with the electronic display panel and the imaging device, determines physical locations of pixels of the electronic display panel on a sensor of the imaging device based on the captured one or more images. The calibration controller also determines a preferred alignment for presenting images by the electronic display panel based on the determined physical locations of the pixels and a projected location of the eyecup.

20 Claims, 6 Drawing Sheets

EYECUP-DISPLAY ALIGNMENT TESTING APPARATUS

BACKGROUND

The present disclosure generally relates to virtual reality head-mounted displays, and specifically relates to eyecup-display alignment testing apparatus for head-mounted displays.

A virtual reality (VR) head-mounted display (HMD) includes at least one eyecup assembly, e.g., one eyecup assembly for each eye of a user wearing the HMD. An eyecup assembly typically comprises an eyecup having one or more optical elements (e.g., at least one lens) attached to it, wherein the eyecup is coupled to an electronic display panel to form an eyecup assembly for each eye of a user wearing the HMD. An eyecup attached to an optical element (e.g., lens) is configured to receive an image light from the electronic display panel and to direct the image light to the optical element (e.g., lens), which directs the image light to a corresponding eye of a user wearing the HMD.

During manufacturing of the HMD, an electronic display panel is not glued in place but coupled to an eyecup via one or more clips. There may be a certain offset (e.g., in the order of several pixels of the electronic display panel) between a centerline of the electronic display panel and a centerline of the eyecup coupled to the electronic display panel. Because of that, an image presented by the electronic display panel and projected from the electronic display panel though the eyecup and its optical element (e.g., lens) into eye(s) of a user wearing the HMD may not appear to the user as a centered image, but instead as a shifted (distorted) image.

SUMMARY

Embodiments of the present disclosure support an apparatus configured to achieve an alignment between an eyecup and an electronic display panel, wherein the eyecup with a lens is coupled to the electronic display panel to form an eyecup assembly for each eye of a user wearing a head-mounted display (HMD). The alignment apparatus presented herein includes an imaging device (e.g., a camera) with a lens (e.g., a wide angle lens) that is positioned to image the electronic display panel through its corresponding eyecup. The alignment apparatus maps the electronic display panel to an image captured by the camera based on having different areas of the electronic display panel blink out specific (e.g., binary) codes. The alignment apparatus accounts for offsets in a centerline of the electronic display panel and a centerline of the eyecup by minimizing (e.g., using an iterative process) a distance from a projected location of the eyecup to an actual location of the eyecup seen in images captured by the camera. An aligned eyecup assembly can be integrated into the HMD, wherein the obtained alignment data may be uploaded to a memory of the HMD and/or a centralized storage device (e.g., cloud storage).

In some embodiments, an apparatus for aligning an eyecup assembly includes an imaging device, and a calibration controller. An eyecup assembly includes an eyecup and an electronic display panel that is coupled to the eyecup. The imaging device is configured to capture one or more images of image light projected by the electronic display panel through the eyecup. The calibration controller, interfaced with the electronic display panel and the imaging device, is configured to obtain the one or more images captured by the imaging device, and perform a mapping between pixels of the electronic display panel and pixels of a sensor of the imaging device based on the captured one or more images. The calibration controller is further configured to determine a preferred alignment for presenting images by the electronic display panel based on information about the mapping and a modeled image of the eyecup, and store information about the preferred alignment in a memory coupled to the electronic display panel.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1A:
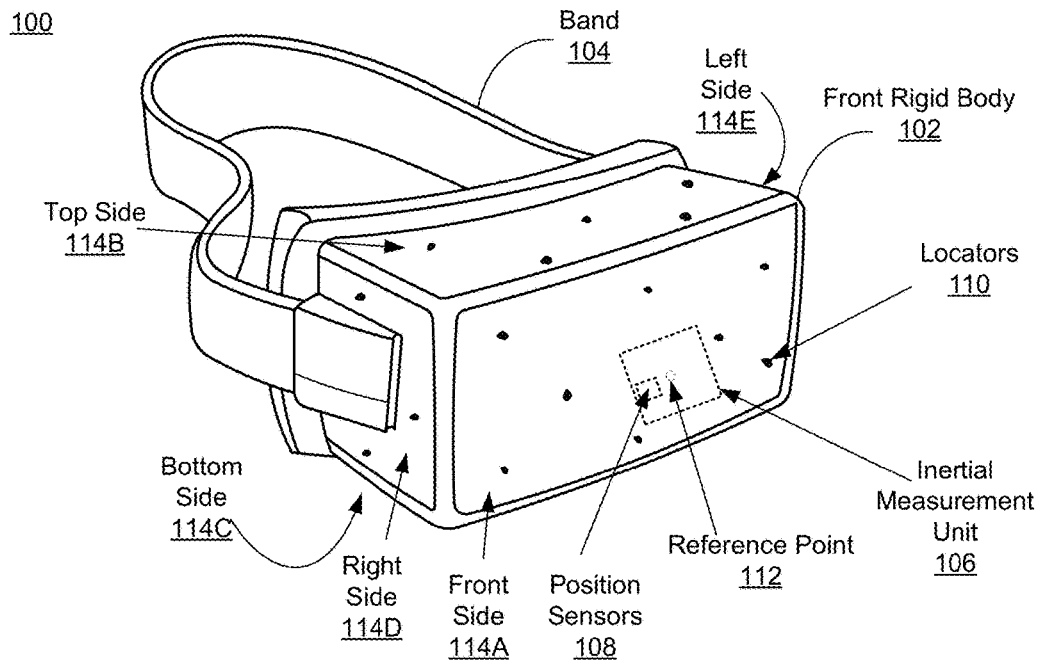
FIG. 1A is a diagram of a head-mounted display (HMD), in accordance with an embodiment.

FIG. 1A is a diagram of a head-mounted display (HMD) 100, in accordance with an embodiment. The HMD 100 is a head-mounted display that presents media to a user. Examples of media presented by the HMD 100 include one or more images, video, audio, or some combination thereof. In some embodiments, audio is presented via an external device (e.g., speakers and/or headphones) that receives audio information from the HMD 100, a virtual reality (VR) console (not shown), or both, and presents audio data based on the audio information. The HMD 100 is generally configured to operate as a VR HMD. However, in some embodiments, the HMD 100 may be modified to also operate as an augmented reality (AR) HMD, a mixed reality (MR) HMD, or some combination thereof. For example, in some embodiments, the HMD 100 may augment views of a physical, real-world environment with computer-generated elements (e.g., images, video, sound, etc.).

The HMD 100 shown in FIG. 1A includes a front rigid body 102 and a band 104. The front rigid body 102 includes one or more optical elements which together display media to users. The band 104 is configured for users to wear the HMD 100 on their head. As discussed below in conjunction with FIG. 1B, the front rigid body 102 includes at least one eyecup coupled to an electronic display forming at least one eyecup assembly for directing image lights to user's eye(s). The front rigid body 102 may further include an inertial measurement unit (IMU) 106, one or more position sensors 108 and locators 110. In the embodiment shown by FIG. 1A, the position sensors 108 are located within the IMU 106, and neither the IMU 106 nor the position sensors 108 are visible to the user (e.g., located beneath an outer surface of the HMD 100).

The electronic display of the eyecup assembly positioned within the front rigid body 102 displays images to the user in accordance with data received from one or more processing elements, such as a VR console (not shown). In various embodiments, the electronic display may comprise a single electronic display panel or multiple electronic displays panels (e.g., a display panel for each eye of a user). Examples of the electronic display include: a liquid crystal display (LCD), an organic light emitting diode (OLED) display, an active-matrix organic light-emitting diode display (AMO-LED), some other display, or some combination thereof.

The locators 110 are objects located in specific positions on the HMD 100 relative to one another and relative to a specific reference point on the HMD 100. A locator 110 may be a light emitting diode (LED), a corner cube reflector, a reflective marker, a type of light source that contrasts with an environment in which the HMD 100 operates, or some combination thereof. In embodiments where the locators 110 are active (i.e., an LED or other type of light emitting device), the locators 110 may emit light in the visible band (~380 nm to 750 nm), in the infrared (IR) band (~750 nm to 1 mm), in the ultraviolet band (10 nm to 380 nm), in some other portion of the electromagnetic spectrum, or in some combination thereof.

In some embodiments, the locators 110 are located beneath an outer surface of the HMD 100, which is transparent to the wavelengths of light emitted or reflected by the locators 110 or is thin enough to not substantially attenuate the wavelengths of light emitted or reflected by the locators 110. Additionally, in some embodiments, the outer surface or other portions of the HMD 100 are opaque in the visible band of wavelengths of light. Thus, the locators 110 may emit light in the IR band under an outer surface that is transparent in the IR band but opaque in the visible band.

As illustrated in FIG. 1A, the locators 110 are located in fixed positions on the front rigid body 102 relative to one another and relative to a reference point 112. In the example of FIG. 1A, the reference point 112 is located at the center of the IMU 106. Each of the locators 110 emits light that is detectable by an imaging device (e.g., camera). Locators 110, or portions of locators 110, are located on a front side 114A, a top side 114B, a bottom side 114C, a right side 114D, and a left side 114E of the front rigid body 102 in the example of FIG. 1A.

The IMU 106 is an electronic device that generates fast calibration data indicating an estimated position of the HMD 100 relative to an initial position of the HMD 100 based on measurement signals received from one or more of the position sensors 108. A position sensor 108 generates one or more measurement signals in response to motion of the HMD 100. Examples of position sensors 108 include: one or more accelerometers, one or more gyroscopes, one or more magnetometers, another suitable type of sensor that detects motion, a type of sensor used for error correction of the IMU 106, or some combination thereof. The position sensors 108 may be located external to the IMU 106, internal to the IMU 106, or some combination thereof.

Based on the one or more measurement signals generated by the one or more position sensors 108, the IMU 106 generates fast calibration data indicating an estimated position of the HMD 100 relative to an initial position of the HMD 100. For example, the position sensors 108 include multiple accelerometers to measure translational motion (forward/back, up/down, left/right) and multiple gyroscopes to measure rotational motion (e.g., pitch, yaw, roll). In some embodiments, the IMU 106 rapidly samples the measurement signals from various position sensors 108 and calculates the estimated position of the HMD 100 from the sampled data. For example, the IMU 106 integrates the measurement signals received from one or more accelerometers over time to estimate a velocity vector and integrates the velocity vector over time to determine an estimated position of a reference point on the HMD 100. The reference point is a point that may be used to describe the position of the HMD 100. While the reference point may generally be defined as a point in space; however, in practice the reference point is defined as a point within the HMD 100 (e.g., the reference point 112 representing a center of the IMU 106).

Figure 1B:
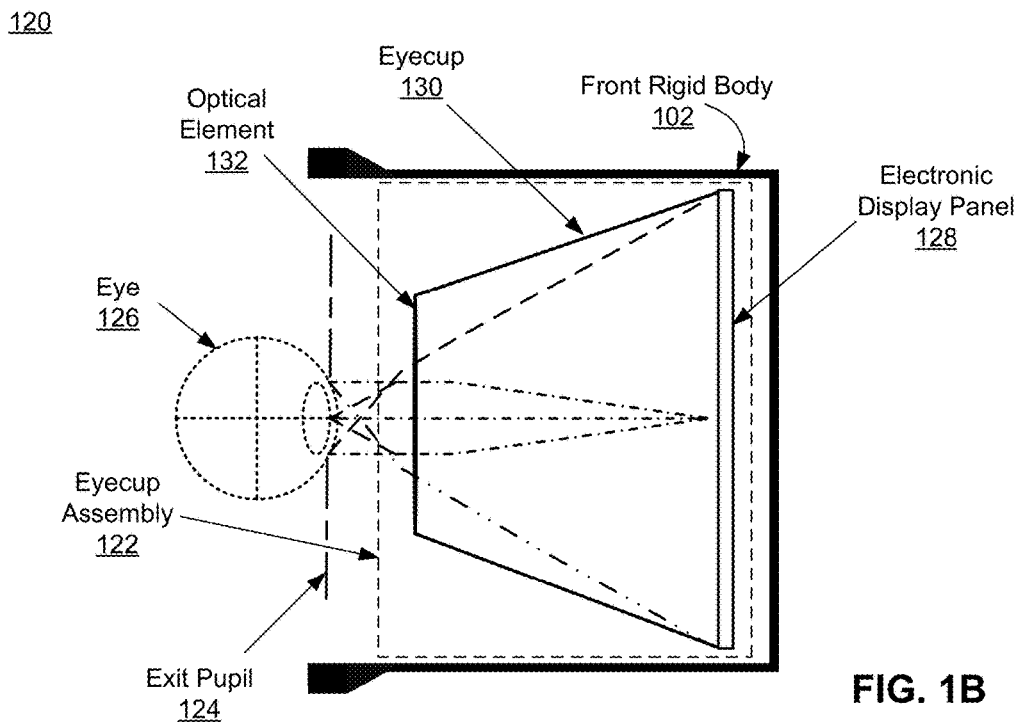
FIG. 1B is a cross-section of a front rigid body of the HMD illustrated in FIG. 1A, in accordance with an embodiment.

FIG. 1B is a cross section 120 of the front rigid body 102 of the embodiment of the HMD 100 illustrated in FIG. 1A, according to an embodiment. As shown in FIG. 1B, the front rigid body 102 includes an eyecup assembly 122 that provides altered image light to an exit pupil 124. The exit pupil 124 is a location where a user's eye 126 is positioned while using the HMD 100. For purposes of illustration, FIG. 1B shows a cross section 120 associated with a single eye 126, but another eyecup assembly, separate from the eyecup assembly 122, provides altered image light to another eye of the user.

The eyecup assembly 122 includes an electronic display panel 128, an eyecup 130 coupled to the electronic display panel 128 and an optical element 132 attached to the eyecup 130. The electronic display panel 128 emits image light toward the eyecup 130 and the optical element 132. In some embodiments, the optical element 132 corrects for one or more optical errors (e.g., distortion, astigmatism, etc.). The optical element 132 directs, via the eyecup 130, corrected image light to the exit pupil 124 for presentation to the user.

The optical element 132 magnifies received light, corrects optical errors associated with the image light, and presents the corrected image light to a user of the HMD 100. Example optical elements 132 attached to the eyecup 130 may include: an aperture, a Fresnel lens, a convex lens, a concave lens, a filter, or any other suitable optical element that affects image light. Magnification of the image light by the optical element 132 allows the electronic display panel 128 to be physically smaller, weigh less, and consume less power than larger displays. Additionally, magnification may increase a field of view of the content presented by the electronic display panel 128. For example, the field of view of the displayed content is such that the displayed content is presented using almost all (e.g., 110 degrees diagonal), and in some cases all, of the user's field of view. Additionally, in some embodiments, the amount of magnification may be adjusted by adding or removing optical elements.

The optical element 132 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. In some embodiments, content provided to the electronic display panel 128 for display is pre-distorted, and the optical element 132 corrects the distortion when it receives image light from the electronic display panel 128 generated based on the content.

The front rigid body 102 of the HMD 100 may include the eyecup assembly 122 for each eye. Each eyecup assembly 122 includes the eyecup 130 and is configured to receive image light from the electronic display panel 128 and direct the image light to the optical element (e.g., lens) 132, which directs the image light to a corresponding eye of a user wearing the HMD 100.

During manufacturing of the HMD 100 and the eyecup assembly 122, the electronic display panel 128 is not glued in place but instead coupled to the eyecup 130 via one or more clips (not shown). A certain offset (e.g., of several pixels of the electronic display panel 128) may exist between a line of the electronic display panel 128 that corresponds to a centerline of the user's eye 126 (e.g., right or left centerline of the electronic display panel 128 depending on the user's eye 126) looking straight at the electronic display panel 128 and a centerline of the eyecup 130 coupled to the electronic display panel 128. If the offset between the centerline (e.g., the right or left centerline) of the electronic display panel 128 and the centerline of the eyecup 130 is not corrected, the light emitted from the electronic display panel 128 (i.e., pixels of the electronic display panel 128) through the eyecup 130 and the optical element (e.g., lens) 132 may appear as a shifted or a distorted image at the user's eye 126.

Embodiments of the present disclosure relate to an apparatus for alignment between an eyecup and an electronic display panel, wherein the eyecup is coupled to the electronic display panel to form an eyecup assembly within an HMD (e.g., the HMD 100 illustrated in FIG. 1A).

Figure 2:
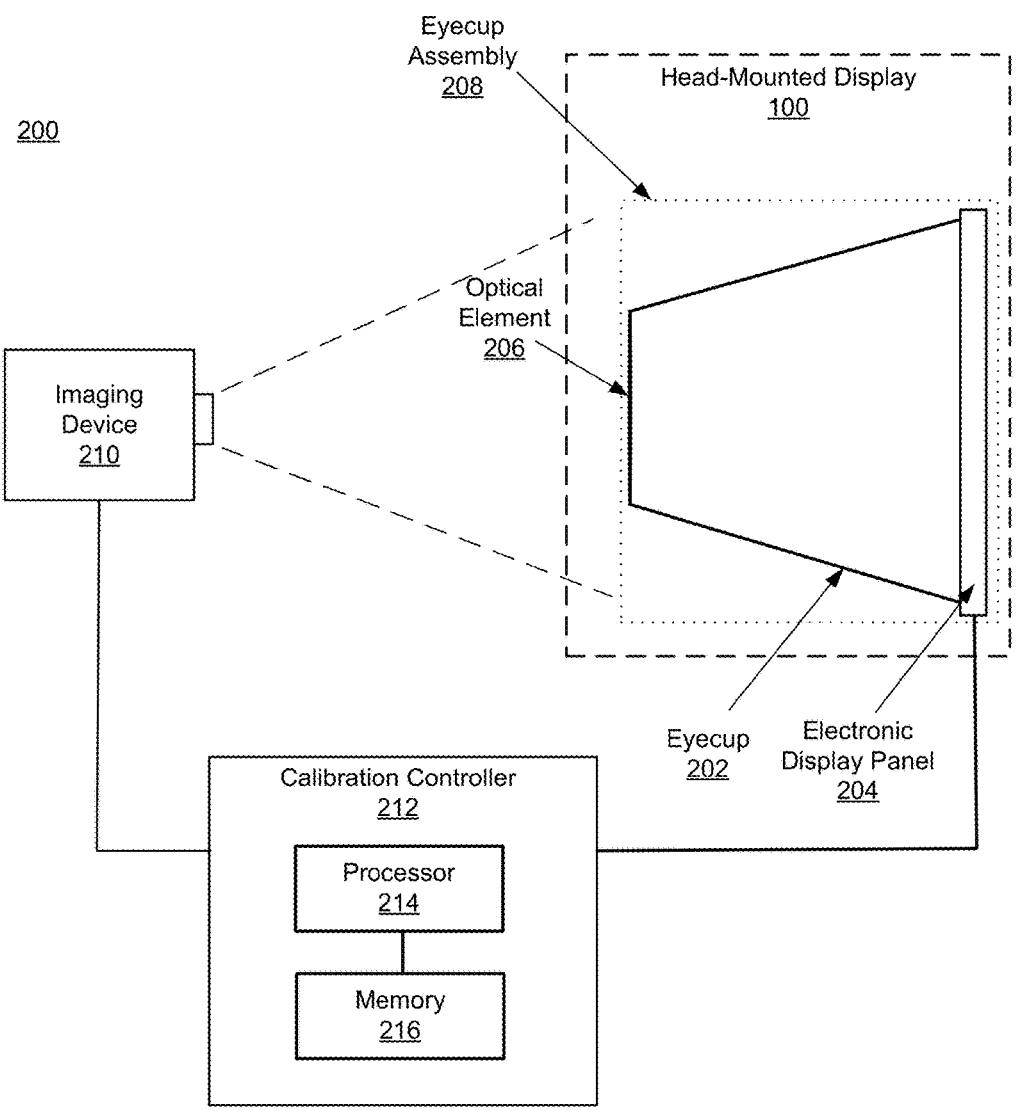
FIG. 2 illustrates a block diagram of a system environment for aligning of an eyecup and an electronic display panel, in accordance with an embodiment.

FIG. 2 illustrates a block diagram of a system environment 200 for aligning of an eyecup 202 and an electronic display panel 204, in accordance with an embodiment. The eyecup 202 shown in FIG. 2 may correspond to the eyecup 130 from FIG. 1B of the HMD 100 shown in FIG. 1A, and the electronic display panel 204 shown in FIG. 2 may correspond to the electronic display panel 128 from FIG. 1B of the HMD 100. As illustrated in FIG. 2, the eyecup 202 having an optical element (e.g., lens) 206 on its front (top) portion may be coupled to the electronic display panel 204 forming an eyecup assembly 208. For certain embodiments, the optical element 206 may correspond to the optical element 132 illustrated in FIG. 1B, and the eyecup assembly 208 may represent the eyecup assembly 122 from FIG. 1B during manufacturing of the HMD 100 shown in FIG. 1A.

The system environment 200 furthers includes an imaging device (e.g., camera) 210. The imaging device 210 may be a camera with a lens providing a field of view sufficient to image the largest number of pixels of the electronic display panel 204 through the eyecup 202. The largest number of pixels may be all of the pixels of the electronic display panel 204 or some portion thereof. In some embodiments, the imaging device 210 is a wide angle lens providing a wide field of view (e.g., angle of field of view of approximately 170°). The imaging device 210 is fixed and positioned in front of the eyecup assembly 208 to image all pixels of the electronic display panel 204 through the eyecup 202. In an embodiment of the present disclosure, the imaging device 210 may be a mono-chromatic camera (e.g., black-and-white camera). In another embodiment, the imaging device 210 may be a multi-chromatic camera (e.g., color camera).

The system environment 200 further includes a calibration controller 212 that may be interfaced with both the imaging device 210 and the electronic display panel 204. As illustrated in FIG. 2, the calibration controller 212 may comprise a processor 214 coupled to a memory 216. As discussed in more detail below in conjunction with FIG. 4, the calibration controller 212 may be configured to perform mapping between pixels of the electronic display panel 204 and an image of the electronic display panel 204 (i.e., image of pixels of the electronic display panel 204) captured by the imaging device 210, i.e., one-to-one mapping between the pixels of the electronic display panel 204 and pixels of a sensor of the imaging device 210. Once the mapping is performed, both the calibration controller 212 and the imaging device 210 may know an exact physical location of each pixel of the electronic display panel 204 on a sensor of the imaging device 210. Based on the mapping information, the calibration controller 212 may be configured to adjust operation of the pixels of the electronic display panel 204 such that images projected from the electronic display panel 204 though the eyecup 202 and the optical element (e.g., lens) 206 appear centered in user's eye(s) wearing the HMD 100. In this way, the alignment between the centerline of the eyecup 202 and the centerline of the electronic display panel 204 can be achieved without physically moving the eyecup 202 and/or the electronic display panel 204 relative to each other.

Figure 3:
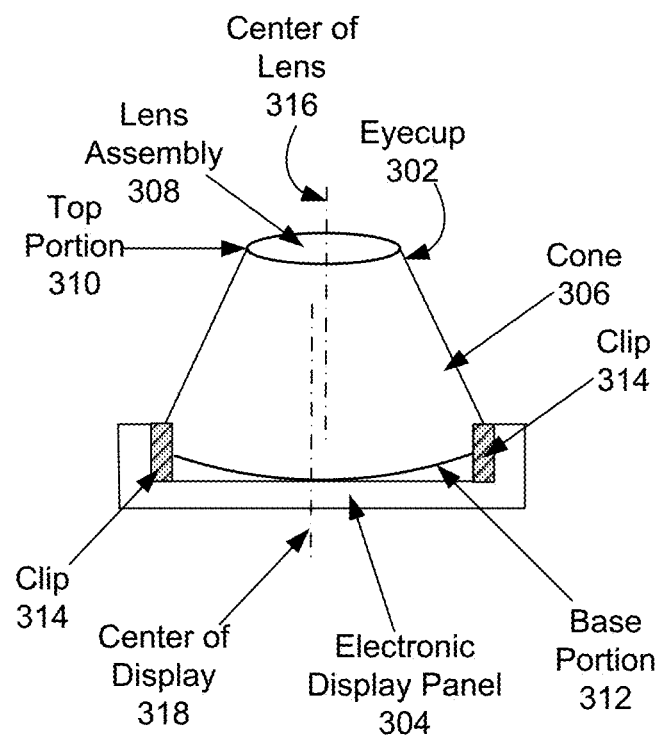
FIG. 3 is a wire diagram of an eyecup assembly shown in FIG. 1B, in accordance with an embodiment.

FIG. 3 is a wire diagram of an eyecup assembly 122 shown in FIG. 1B, in accordance with an embodiment. The eyecup assembly 122 includes an eyecup 302 coupled to an electronic display panel 304 forming an eyecup assembly illustrated during manufacturing of an eyecup assembly that may be integrated into an HMD (e.g., the eyecup assembly 208 of the HMD 100), in accordance with an embodiment. The eyecup 302 may correspond to the eyecup 130 shown in FIG. 1B and/or the eyecup 202 shown in FIG. 2; the electronic display panel 304 may correspond to the electronic display panel 128 shown in FIG. 1B and/or the electronic display panel 204 shown in FIG. 2. As illustrated in FIG. 3, the eyecup 302 may include a cone 306 and a lens assembly 308. In some embodiments, the lens assembly 308 is substantially the same as the optical element 132 shown in FIG. 1B. The cone 306 includes a top portion 310 and a base portion 312. The top portion 310 is coupled to the lens assembly 308 and is configured to hold the lens assembly 308. The cone 306 is configured to receive image light through the base portion 312 and direct the image light toward the lens assembly 308.

During manufacturing, the electronic display panel 304 is not glued in place, but instead the eyecup 302 may be attached to the electronic display panel 304 via clips 314. In accordance with embodiments of the present disclosure, a certain offset may exist between a centerline 316 of the eyecup 302 and a centerline 318 of the display panel 304. For some embodiments, the offset between the centerline 316 and the centerline 318 may be in order of several pixels (e.g., less than ten pixels) of the electronic display panel 304. Due to the offset between the centerline 316 and the centerline 318, an image light emitted from pixels of the electronic display panel 304 and directed through the eyecup 302 and the lens assembly 308 may appear in eye(s) of the user wearing the HMD 100 as a deformed and a non-centered (shifted) image. Hence, the appropriate alignment between the eyecup 302 and the electronic display panel 304 needs to be performed. In order to achieve this, a physical location of each pixel of the electronic display panel 304 on images presented by the electronic display panel 304 may need to be determined.

Figure 4:
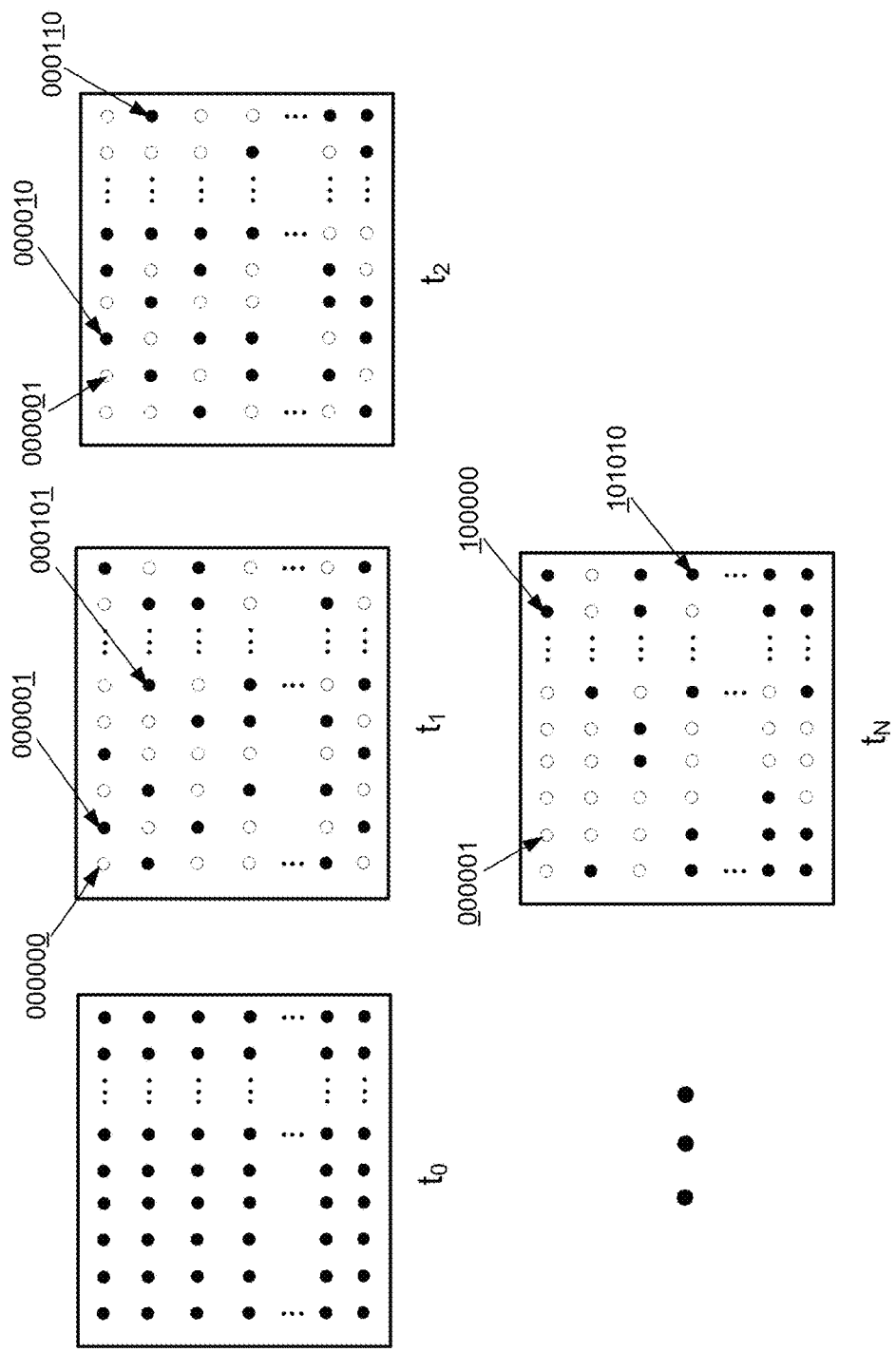
FIG. 4 is a frontal view of an electronic display panel having different combinations of pixels turned on and off in different time instants for mapping between pixels of the electronic display panel and physical locations (e.g., pixels) in a sensor of an imaging device (e.g., camera) of the system environment illustrated in FIG. 2, in accordance with an embodiment.

FIG. 4 is a frontal view of an electronic display panel having different combinations of pixels turned on and off in different time instants for mapping between pixels of the electronic display panel and physical locations (e.g., pixels) in a sensor of an imaging device (e.g., camera) of the system environment 200 illustrated in FIG. 2, in accordance with an embodiment. The electronic display panel illustrated in FIG. 4 may correspond to the electronic display panel 204 of the system environment 200 from FIG. 2 and/or the electronic display panel 304 shown in FIG. 3. For certain embodiments, the electronic display panel illustrated in FIG. 4 may comprise the same number of pixels in both horizontal and vertical directions (e.g., approximately 1000 pixels in both horizontal and vertical directions). In one or more embodiments of the present disclosure, all pixels of the electronic display panel may be of the same size. In one or more other embodiments, pixels of the electronic display panel may be of different sizes. For the illustrative embodiment of the present disclosure shown in FIG. 4, pixels in the electronic display panel may be RGB (red-green-blue) pixels that emit light of a certain predefined wavelength when they are turned on (e.g., green light). In an embodiment, the imaging device 210 may be a mono-chromatic camera (e.g., black-and-white camera).

Referring back to the system environment 200 illustrated in FIG. 2, the processor 214 of the calibration controller 212 interfaced with the electronic display panel 204 and the imaging device 210 (e.g., mono-chromatic camera) may be configured to control the operation of the electronic display panel 204 such that, in each time instant, a specific subset of pixels are turned on while remaining pixels in the electronic display panel 204 are turned off. As illustrated in FIG. 4, in time instant $t_0$, all pixels in the electronic display panel are turned on. During this time instant, the imaging device 210 (e.g., a camera with a wide angle lens) can capture an image of the electronic display panel 204 when all pixels are turned on. Based on the captured image (e.g., captured by a sensor of the imaging device 210), the imaging device 210 may be able to acquire knowledge of a physical location of each individual pixel on the electronic display panel 204. In order to determine a physical location of each pixel of the electronic display panel 204 on a sensor of the imaging device 210 (i.e., a physical location on an image captured by the imaging device 210 that emulates a user's eye), one-to-one mapping between pixels of the sensor of the imaging device 210 and pixels of the electronic display panel 204 needs to be determined.

For certain embodiments of the present disclosure, a unique binary identifier (ID) may be assigned to each pixel in the electronic display panel 204. A value of a binary digit in the binary ID assigned to a pixel may determine whether that particular pixel is turned on or turned off in a frame number (i.e., time instant) that corresponds to a position of the binary digit in the binary ID. As illustrated in FIG. 4, in time instant $t_1$ that follows time instant $t_0$ when all pixels of the electronic display panel were turned on, only those pixels in the electronic display panel with IDs having value of "1" at the least significant binary position (i.e., the first position from the right) may be turned on (e.g., by the processor 214), and the imaging device 210 (e.g., wide angle lens camera with fixed position relative to the eyecup 202 and the electronic display panel 204) may capture an image of the electronic display panel 204 seen through the eyecup 202 at the time instant $t_1$. In the time instant $t_2$ following the time instant $t_1$, a subset of pixels in the electronic display panel with assigned IDs having value of "1" at the position next to the least significant binary position (i.e., the second position from the right) may be turned on (e.g., by the processor 214), and the imaging device 210 (e.g., wide angle lens camera) may capture an image of the electronic display panel 204 seen through the eyecup 202 at the time instant $t_2$. This process may be repeated a pre-determined number of times (e.g., N number of times, as illustrated in FIG. 4), where N may depend on a length of binary IDs assigned to pixels in the electronic display panel 204, i.e., N is a function of the number of pixels in the electronic display panel 204.

At the end of this process of turning pixels of the electronic display panel 204 on and off, based on the images of the electronic display panel 204 captured by the sensor of the imaging device 210, the processor 214 interfaced with the imaging device 210 may determine a physical location of each pixel of the electronic display panel 204 on the sensor of the imaging device 210. In other words, the processor 214 may determine one-to-one mapping between pixels of the sensor of the imaging device 210 and pixels of the electronic display panel 204. In one or more embodiments, information about the mapping between pixels of the sensor of the imaging device 210 and pixels of the electronic display panel 204 may be stored in the memory 216 coupled to the processor 214 of the calibration controller 212.

For some embodiments, the imaging device 210 positioned in front of the eyecup assembly 208 may be a color camera with a wide angle lens (i.e., wide field of view) capable of capturing color images presented by the electronic display panel 204, i.e., color images of pixels on the electronic display panel 204. In this case, instead of assigning a unique binary ID to each pixel of the electronic display panel 204, a unique color (i.e., unique combination of red, green and blue color) may be assigned to each pixel of the electronic display panel 204. Then, the processor 214 may be configured to control operation of the electronic display panel 204 such that, in different time instants, different combinations of pixels of the electronic display panel 204 are turned on, wherein each pixel emits a light of a unique wavelength (i.e., unique color). Different and unique color images may be captured by the imaging device 210 (e.g., color camera), and one-to-one mapping between pixels of the sensor of the imaging device 210 and pixels of the electronic display panel 204 may be determined (e.g., by the processor 214). By utilizing colored light images emitted from pixels of the electronic display panel 204, the process of mapping between pixels of the sensor of the imaging device 210 and pixels of the electronic display panel 204 may be performed faster and more efficient than the mapping process when binary IDs are assigned to pixels of the electronic display panel 204, i.e., a smaller number of images presented by the electronic display panel 204 may need to be captured by the imaging device 210 during a smaller number of consecutive time instants.

Figure 5:
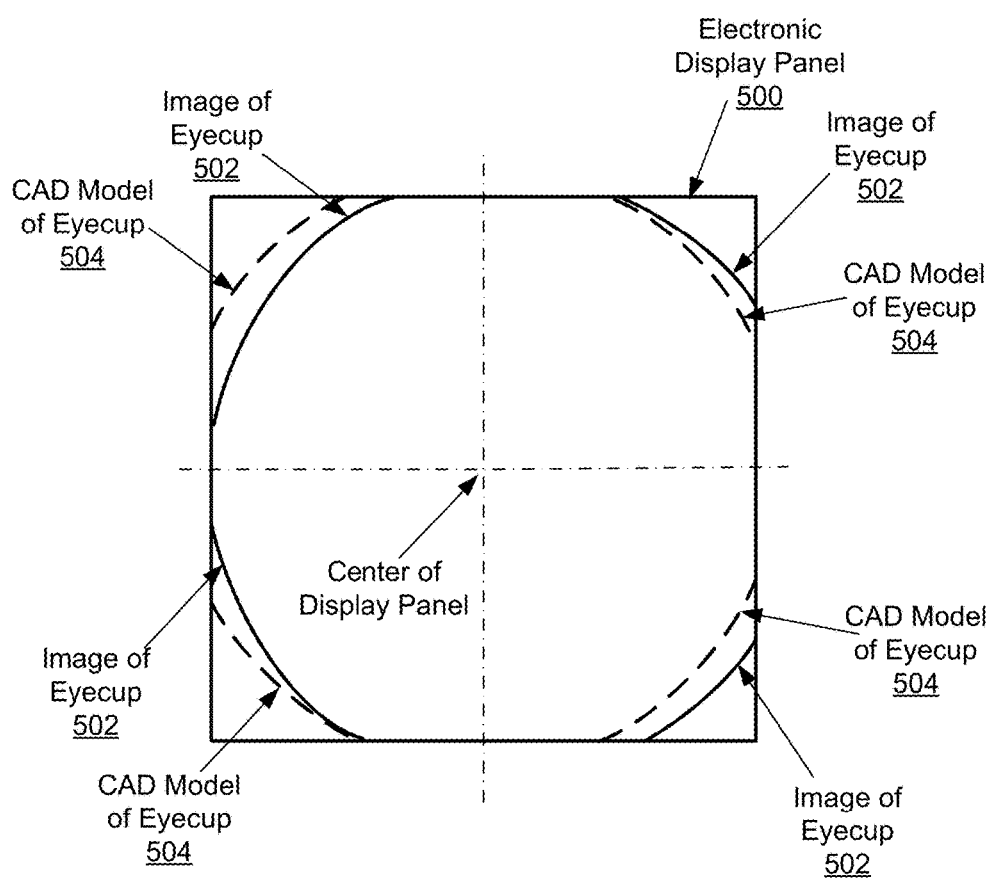
FIG. 5 illustrates a frontal view of an electronic display panel, in accordance with an embodiment.

FIG. 5 illustrates a frontal view of an electronic display panel 500, in accordance with an embodiment. As discussed above, mapping is performed between pixels of the electronic display panel 500 and pixels of a sensor of an imaging device capturing image lights projected from the electronic display panel 500 through an eyecup coupled to the display panel. The electronic display panel 500 presents an image 502 of an eyecup (e.g., a perimeter of the eyecup) coupled to the electronic display panel 500 as being seen and captured by the imaging device positioned in front of the eyecup. For example, the image 502 may be an image of the eyecup 202 coupled to the electronic display panel 204 as being seen and captured by the imaging device 210 of the system environment 200 illustrated in FIG. 2. For certain embodiments, the image 502 presented by the electronic display panel 500 (e.g., the electronic display panel 204 shown in FIG. 2 and/or the electronic display panel 304 shown in FIG. 3) represents edges of the eyecup (e.g., the eyecup 202 shown in FIG. 2 and/or the eyecup 302 shown in FIG. 3) as being seen and captured by the imaging device 210 through the optical element (e.g., the lens 206 shown in FIG. 2 and/or the lens assembly 308 shown in FIG. 3). As discussed above, since there is an offset between a centerline of the eyecup and a centerline of the electronic display panel, the image 502 presented by the electronic display panel may appear shifted and distorted (e.g., in user's eye(s)) relative to a center of the electronic display panel.

For some embodiments, a model of a centered image of the eyecup may be available to the processor 214 controlling operations of the electronic display panel 204. FIG. 5 further illustrates a modelled centered image 504 of the eyecup (e.g., a modelled centered perimeter of the eyecup) that may be utilized for aligning the eyecup to the electronic display panel. In one or more embodiments, the model of the centered image of the eyecup may be a computer-aided design (CAD) model, and the image 504 illustrated in FIG. 5 presented by the electronic display panel 500 may correspond to the CAD model of the centered image of the eyecup (i.e., edges of the eyecup). As discussed, the processor controlling the operations of pixels of the electronic display panel (e.g., the processor 214 interfaced with the electronic display panel 204) may know the exact physical location of each pixels of the electronic display panel at a sensor of the imaging device 210. In an embodiment, the memory 216 coupled to the processor 214 may store information about one-to-one mapping between pixels of the sensor of the imaging device 210 and pixels of the electronic display panel 204. Based on the one-to-one mapping information, the processor 214 can be configured to determine an amount of shift and angular rotation of the image 502 (i.e., alignment data) that needs to be performed in order to match a presented image of the eyecup (i.e., an actual location of the eyecup) with the CAD model 504 of the eyecup (i.e., a projected centered location of the eyecup). By determining the alignment data, an alignment between the eyecup and the electronic display panel may be achieved, without physically moving the eyecup and the electronic display panel relative to each other. Images presented by pixels of the electronic display panel will be presented shifted (or rotated) based on the alignment data in order to obtain centered images in eyes of the user wearing the HMD 100.

For certain embodiments, the processor 214 may be configured to iteratively minimize a distance of the actual location of the eyecup seen in images captured by the imaging device 210 (e.g., the image 502 shown in FIG. 5) from a projected (i.e., a preferred) location of the eyecup (e.g., the CAD model image 504). In one or more embodiments, the processor 214 may be configured to perform edge detection between the image 502 and the CAD model 504 (e.g., between edges 502 and 504 illustrated in FIG. 5).

An aligned eyecup assembly comprising the eyecup and the electronic display panel may be integrated into head-mounted displays (e.g., the HMD 100 illustrated in FIG. 1A). In one or more embodiments, the alignment data obtained by the processor 214 may be uploaded into a memory (e.g., flash memory) of a head-mounted display and utilized to appropriately shift every image presented by an electronic display panel of the head-mounted display, so images seen by the user through the eyecup assembly may appear centered and not shifted or distorted. In one or more other embodiments, the alignment data obtained by the processor 214 may be uploaded into a memory (e.g., flash memory) of a centralized storage device where each manufactured HMD can efficiently access its own alignment data.

For some embodiments, if the alignment determined by the processor 214 is greater than a pre-defined area size of the electronic display panel 204 (e.g., number of pixels for shifting in horizontal and/or vertical directions is greater than a pre-defined threshold), then physical alignment between the eyecup 202 and the electronic display panel 204 (and/or between the eyecup 302 and the electronic display panel 304) may need to be performed before repeating the process of determining one-to-one mapping between pixels of the sensor of the imaging device 210 and pixels of the electronic display panel 204. Referring back to FIG. 3, an improved physical alignment between the eyecup 302 and the electronic display panel 304 may be achieved by better positioning of the electronic display panel 304 relative to the eyecup 302, and then coupling the electronic display panel 304 to the eyecup 302 by employing the clips 314.

Figure 6:
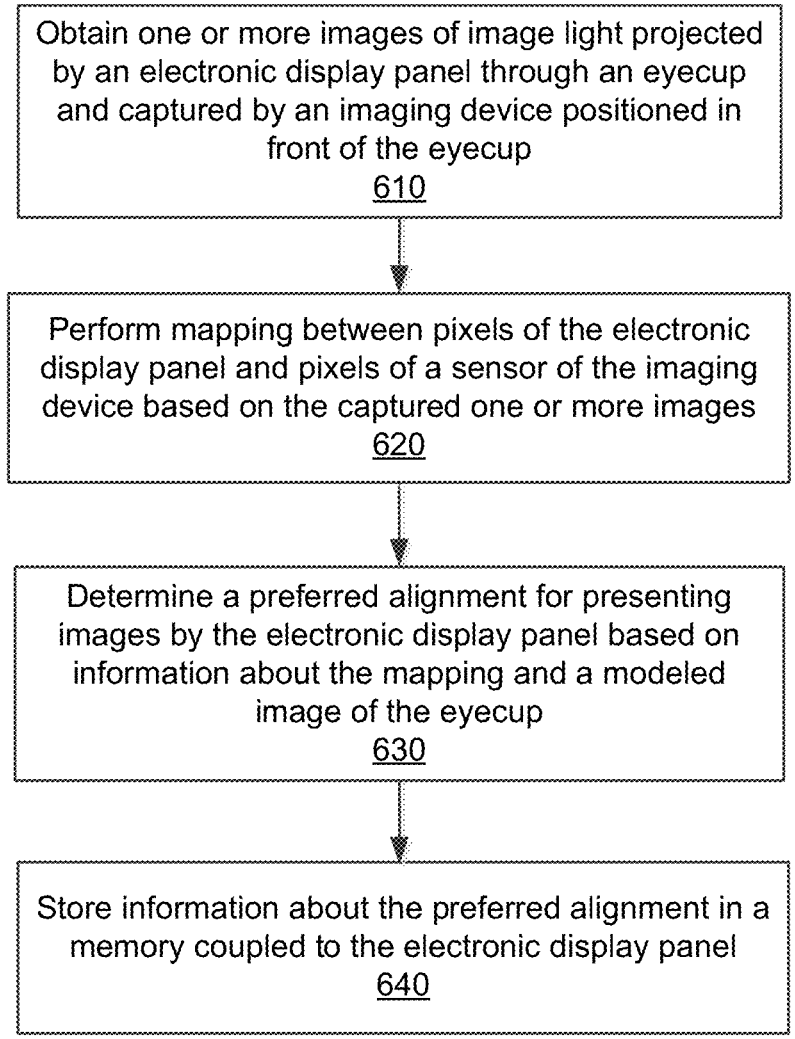
FIG. 6 is a flow chart illustrating a process for aligning an eyecup and an electronic display panel during manufacturing of the HMD illustrated in FIG. 1A, in accordance with an embodiment.

FIG. 6 is a flow chart illustrating a process 600 for aligning an eyecup and an electronic display panel during manufacturing of the HMD 100 illustrated in FIG. 1A, in accordance with an embodiment. The process 600 of FIG. 6 may be performed by the calibration controller 212 as illustrated in FIG. 2. Other entities may perform some or all of the steps of the process in other embodiments. Likewise, embodiments may include different and/or additional steps, or perform the steps in different orders.

Before the aligning process 600, an eyecup (e.g., the eyecup 202 shown in FIG. 2) may be coupled to an electronic display panel (e.g., the electronic display panel 204 shown in FIG. 2) configured to output an image light, the eyecup and the electronic display panel forming an eyecup assembly (e.g., the eyecup assembly 208 shown in FIG. 2). The eyecup assembly (e.g., the eyecup assembly 208) is placed in front of an imaging device (e.g., the imaging device 210 shown in FIG. 2 with a wide angle field or view) in order to capture images of the electronic display panel (e.g., the electronic display panel 204) through the eyecup (e.g., the eyecup 202).

The calibration controller 212 obtains 610 one or more images of image light projected by the electronic display panel (e.g., the electronic display panel 204) through the eyecup (e.g., the eyecup 202) and captured by the imaging device (e.g., the imaging device 210). In some embodiments, the calibration controller 212 may obtain the captured one or more images from the imaging device 210 interfaced with the calibration controller 212.

The calibration controller 212 performs 620 a mapping between pixels of the electronic display panel (e.g., the electronic display panel 204) and pixels of a sensor of the imaging device based on the one or more images. The performed mapping describes a physical location of each pixel of the electronic display panel on an image captured by the imaging device.

The calibration controller 212 determines 630 a preferred alignment for presenting images by the electronic display panel (e.g., a value of an offset between a centerline of the electronic display panel 204 and a centerline of the eyecup 202) based on information about the mapping (i.e., based on information about physical locations of the pixels of the electronic display panel) and a modeled image of the eyecup (e.g., CAD model of the eyecup).

The calibration controller 212 stores 640 the information about the mapping and information related to the preferred alignment (e.g., the offset value) in a memory (e.g., flash memory) of the electronic display panel. In some embodiments, the information about the mapping and information related to the preferred alignment may be also stored (e.g., by the calibration controller 212) on a centralized server (e.g., cloud storage device). Therefore, if, for some reason during operation, an HMD (e.g., the HMD 100 illustrated in FIG. 1A) loses alignment between the eyecup and the electronic display panel, the information about the preferred alignment can be downloaded from the server.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An apparatus comprising:
an imaging device pointed to an electronic display panel and positioned in front of an eyecup, the imaging device configured to capture one or more images of image light projected by the electronic display panel through the eyecup, the eyecup being in a baseline location and coupled to the electronic display panel to form an eyecup assembly; and
a calibration controller, interfaced with the electronic display panel and the imaging device, configured to:
obtain the one or more images captured by the imaging device,
perform a mapping between pixels of the electronic display panel and pixels of a sensor of the imaging device based on the captured one or more images, and
determine alignment data for presenting images by the electronic display panel for achieving effect of aligning physical position of the eyecup relative to the electronic display panel, based on information about the mapping and an image of a modeled eyecup, wherein
a centerline of the modeled eyecup is aligned with a centerline of the electronic display panel, and the eyecup is in the baseline position within the eyecup assembly when presenting the images using the alignment data.

2. The apparatus of claim 1, wherein binary identifiers (IDs) are assigned to the pixels of the electronic display panel, and the calibration controller is further configured to perform the mapping by operating the pixels in different time instants in accordance with values of binary digits in the binary IDs.

3. The apparatus of claim 1, wherein a color is assigned to each pixel of the electronic display panel, and the calibration controller is further configured to perform the mapping by controlling operation of the electronic display panel such that a subset of the pixels emit light in each time instant in accordance with the color assigned to each pixel.

4. The apparatus of claim 1, wherein the imaging device is a mono-chromatic camera.

5. The apparatus of claim 1, wherein the imaging device is a color camera.

6. The apparatus of claim 1, wherein the calibration controller is further configured to store the alignment data and the information about the mapping in a memory of a head-mounted display comprising the eyecup assembly.

7. The apparatus of claim 1, wherein the calibration controller is further configured to store the alignment data in a centralized storage device accessible by a head-mounted display comprising the eyecup assembly.

8. The apparatus of claim 1, wherein the modeled eyecup comprises a computer-aided design model of the eyecup stored in a memory of the calibration controller.

9. The apparatus of claim 1, wherein the calibration controller is further configured to turn on all pixels of the electronic display panel in a defined time instant during the mapping between the pixels of the electronic display panel and the pixels of the sensor of the imaging device.

10. The apparatus of claim 1, wherein the calibration controller is further configured to iteratively determine the alignment data based on the image of the modeled eyecup and the captured one or more images.

11. An apparatus comprising:
an imaging device pointed to an electronic display panel and positioned in front of an eyecup, the imaging device configured to capture one or more images of image light projected by the electronic display panel through the eyecup, the eyecup being in a baseline location and coupled to the electronic display panel to form an eyecup assembly; and
a calibration controller, interfaced with the electronic display panel and the imaging device, configured to:
obtain the one or more images captured by the imaging device,
perform a mapping between pixels of the electronic display panel and pixels of a sensor of the imaging device based on the captured one or more images,
determine alignment data for presenting images by the electronic display panel for achieving effect of aligning physical position of the eyecup relative to the electronic display panel, based on information about the mapping and an image of a modeled eyecup, wherein a centerline of the modeled eyecup is aligned with a centerline of the electronic display panel, and the eyecup is in the baseline position within the eyecup assembly when presenting the images using the alignment data, and
store the alignment data in a memory coupled to the electronic display panel.

12. The apparatus of claim 11, wherein binary identifiers (IDs) are assigned to the pixels of the electronic display panel, and the calibration controller is further configured to perform the mapping by operating the pixels in different time instants in accordance with values of binary digits in the binary IDs.

13. A method comprising:
obtaining one or more images of image light projected by an electronic display panel through an eyecup in a baseline position and captured by an imaging device positioned in front of the eyecup and pointed to the electronic display panel;
performing a mapping between pixels of the electronic display panel and pixels of a sensor of the imaging device based on the captured one or more images;
determining alignment data for presenting images by the electronic display panel for achieving effect of aligning physical position of the eyecup relative to the electronic display panel, based on information about the mapping and an image of a modeled eyecup, wherein a centerline of the modeled eyecup is aligned with a centerline of the electronic display panel, and the eyecup is in the baseline position within the eyecup assembly when presenting the images using the alignment data; and
storing the alignment data in a memory coupled to the electronic display panel.

14. The method of claim 13, further comprising:
assigning binary identifiers (IDs) to the pixels of the electronic display panel; and
wherein performing the mapping between pixels of the electronic display panel and pixels of a sensor of the imaging device based on the captured one or more images comprises:
operating the pixels in different time instants in accordance with values of binary digits in the binary IDs.

15. The method of claim 13, further comprising:
assigning a color to each pixel of the electronic display panel; and
wherein performing the mapping between pixels of the electronic display panel and pixels of a sensor of the imaging device based on the captured one or more images comprises:
controlling operation of the electronic display panel such that a subset of the pixels emit light in each time instant in accordance with the color assigned to each pixel.

16. The method of claim 13, further comprising:
storing the information about the mapping in the memory coupled to the electronic display panel.

17. The method of claim 13, further comprising:
storing the alignment data in a centralized storage device accessible by a head-mounted display comprising the eyecup and the electronic display panel.

18. The method of claim 13, wherein the modeled eyecup comprises a computer-aided design model of the eyecup.

19. The method of claim 13, further comprising:
turning on all pixels of the electronic display panel in a defined time instant during the mapping between the pixels of the electronic display panel and the pixels of the sensor of the imaging device.

20. The method of claim 13, further comprising:
determining, in an iterative manner, the alignment data based on the image of the modeled eyecup and the captured one or more images.

* * * * *